Aug. 1, 1967  W. V. OPFER, JR., ET AL  3,333,793
BALANCED LIFT YAW CONTROL SYSTEM FOR VTOL AIRCRAFT
Filed Aug. 6, 1965  2 Sheets-Sheet 1

INVENTORS
WALDO VIRGIL OPFER, JR.
RICHARD THOMAS PRIESTLEY
BY
Knox & Knox

Aug. 1, 1967   W. V. OPFER, JR., ET AL   3,333,793
BALANCED LIFT YAW CONTROL SYSTEM FOR VTOL AIRCRAFT
Filed Aug. 6, 1965   2 Sheets-Sheet 2

INVENTORS
WALDO VIRGIL OPFER, JR.
RICHARD THOMAS PRIESTLEY
BY
Knox & Knox

United States Patent Office 3,333,793
Patented Aug. 1, 1967

3,333,793
BALANCED LIFT YAW CONTROL SYSTEM FOR VTOL AIRCRAFT
Waldo Virgil Opfer, Jr., and Richard Thomas Priestley, San Diego, Calif., assignors to The Ryan Aeronautical Co., San Diego, Calif.
Filed Aug. 6, 1965, Ser. No. 477,892
6 Claims. (Cl. 244—52)

The present invention relates to aircraft and specifically to a balanced lift yaw control system for VTOL aircraft.

In some types of VTOL aircraft yaw control is usually provided by auxiliary air or gas flow from suitably located outlets at which there are means to direct the flow. The auxiliary or control flow can be obtained by tapping from the primary propulsion or lift engines, or from individual ducted fans, lift engines, or other sources. For yaw control action the control flow is deflected to one side or the other of the aircraft by guide means, or the volumetric flow is varied by throttling or spoiling techniques. In most cases, especially with ducted fans or lift engines having generally vertical thrust, the control flow contributes to the total lift and can also be used for pitch control. This is particularly true for ducted fan or lift engine units installed near the nose or tail of an aircraft to provide combined pitch and yaw control and often longitudinal propulsive force for transitional maneuvers. It will be evident that, if the flow from such units is deflected or varied to provide a lateral or yaw reaction, the vertical lift must be decreased, resulting in an undesirable pitching action. Since it is impractical, due to the fine degree of control necessary for precise maneuvering, to combine engine speed control in combination with directional control to compensate for the lift changes, it is necessary to utilize the available control flow in such a manner that lift is not affected by yaw control action.

The primary object of this invention, therefore, is to provide a yaw control system wherein the control gas flow is split and deflected equally to opposite sides of the aircraft in the neutral position, the effective lift at a given power setting being intentionally degraded in the neutral position, with flow control means arranged so that, as the lift of one part of the divided flow is decreased due to a lateral deflection for yaw control, the other part of the divided flow is deflected downwardly to increase the effective lift of that part of the flow and maintain the total lift substantially constant.

Another object of this invention is to provide a yaw control system wherein flow is controlled by movable guide vanes which comprise the closure doors for the control flow outlet when not in use.

Another object of this invention is to provide a yaw control system wherein the doors controlling the two parts of the divided flow are interconnected so that the direction and effective lift of the two parts of the flow are synchronized to balance the total lift.

A further object of this invention is to provide a yaw control system which is adaptable to single or multiple ducted fan, lift engine, or other flow outlet arrangements in various positions on an aircraft, the mechanism being easily coupled to the existing aircraft yaw control means.

Typical installations and the functioning of the system are illustrated in the drawings, in which.

Similar characters of reference indicate similar or identical elements and portions throughout the specification and throughout the views of the drawings.

Basic installation

Figure 1:
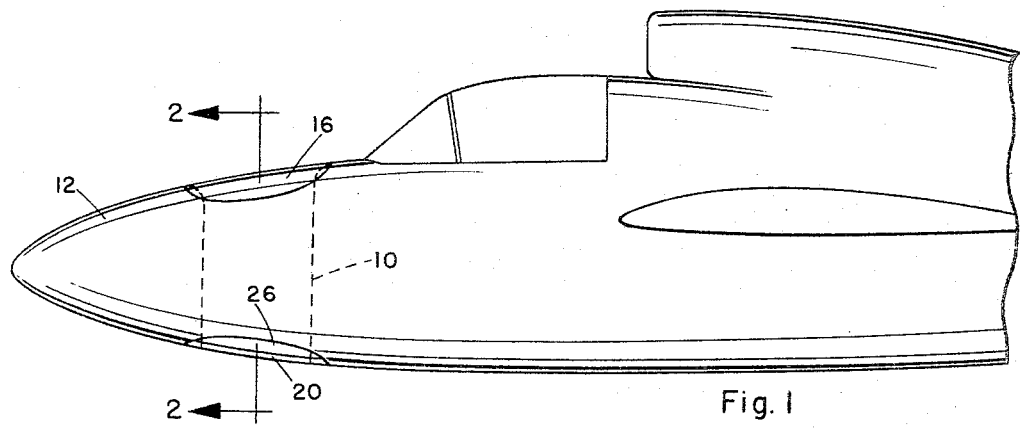
FIGURE 1 is a side elevational view of an aircraft nose incorporating a yaw control installation.
Figure 2:
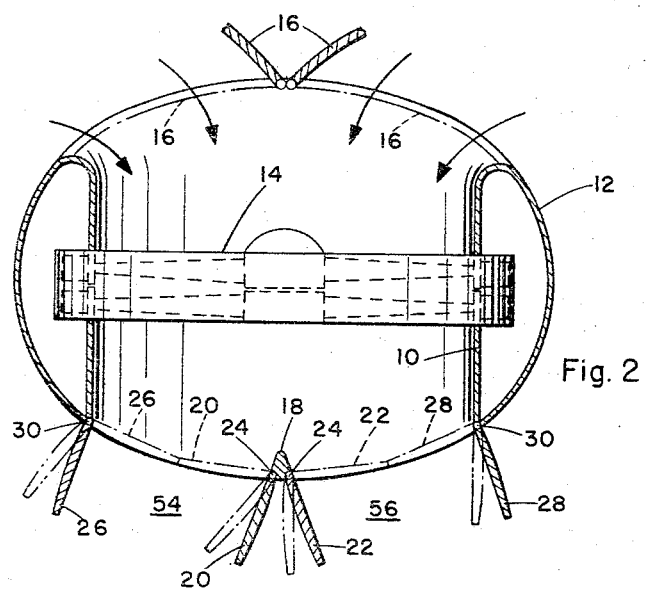
FIGURE 2 is an enlarged sectional view taken on line 2—2 of FIGURE 1, showing a ducted fan unit.

The yaw control unit can be installed either forward or aft of the center of gravity of an aircraft to obtain a suitable force moment for the yaw action. In FIGURES 1 and 2 a nose mounted installation is shown, with a duct 10 extending substantially vertically through the aircraft nose 12 and a fan unit 14 mounted axially in the duct. The fan may be driven by a tip turbine powered by gas from the primary propulsion engine of the aircraft, or by any other suitable means, the techniques being well known. The upper end of duct 10 is provided with inlet doors 16 of any convenient configuration, the doors sealing the duct and forming portions of the nose surface structure when closed and opening to admit air when the fan is operating. At the lower end of duct 10 are the combination flow control means and closure doors which, for convenience, will be referred to as control doors.

Extending across the duct 10 is a center beam 18 substantially along the longitudinal axis of the aircraft and providing support for inner control doors 20 and 22, which are mounted on hinges 24 along said beam to swing downwardly and inwardly. Outer control doors 26 and 28 are mounted on hinges 30 on opposite sides of duct 10 to swing downwardly and outwardly. In the closed position the control doors seal the lower end of duct 10 and form part of the lower nose surface.

Actuating mechanism

Figure 5:
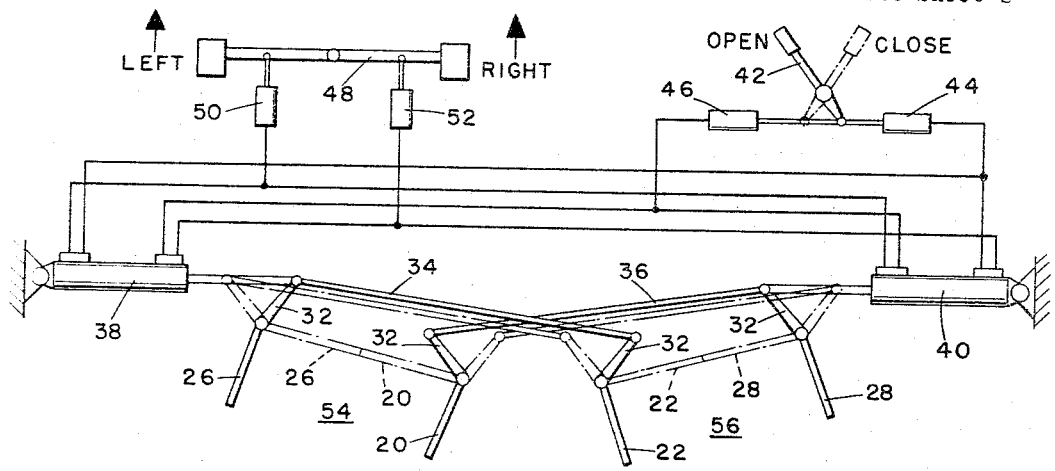
FIGURE 5 is a diagram of a suitable actuating mechanism.

A simple actuating system for the control doors is shown in FIGURE 5 and is intended only as an example. Each control door is provided with an actuating arm 32, the arms of doors 22 and 26 being connected by a link 34 and the arms of doors 20 and 28 similarly connected by a link 36. A push-pull type actuator 38 is connected to link 34 and a similar actuator 40 is connected to link 36. Control doors 22 and 26 thus move together in one direction and control doors 20 and 28 move together in the other direction to open and close. The opening and closing is operated by a handle 42 coupled to a pair of opposed control units 44 and 46. Control unit 44 is coupled to actuators 38 and 40 to extend both actuators simultaneously and open the control doors, while control unit 46 is coupled to retract both actuators and close the doors. The open position is indicated in full line and the closed position in broken line in FIGURE 5.

Yaw control is obtained by connecting the system to the aircraft's rudder pedals 48, or other suitable control. The pedals operate a pair of control units 50 and 52, the control unit 50 being connected to extend actuator 38 while retracting actuator 40, and control unit 52 being connected to extend actuator 40 while retracting actuator 38. It will thus be evident that operation of the rudder pedals 48 causes all of the control doors to move simultaneously in a common direction.

The control units and actuators may be electrical, fluid operated, mechanical, or combinations thereof, depending on the services available in the aircraft.

Operation

Figure 3:
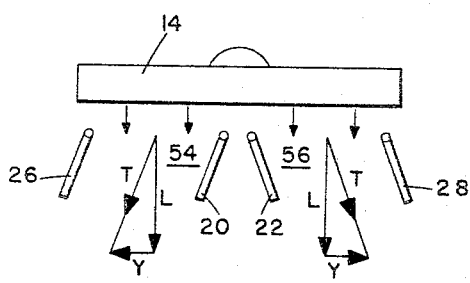
FIGURE 3 is a diagram of the lift and yaw forces of the system in neutral position.

In vertical flight with the fan unit 14 operating the inlet doors 16 and control doors 20, 22, 26, and 28 are all open to the position indicated in full line in FIGURE 2. In this neutral position, the control doors are in pairs 20, 26 and 22, 28 forming a pair of flow channels 54 and 56 on opposite sides of the longitudinal axis, the paired doors being inclined outwardly in a symmetrical configuration. The flow from fan unit 14 is thus split into two streams and deflected divergently downwardly to opposite sides, the actual angle depending on the range of control desired. In the force diagram of FIGURE 3 it can be seen that the lift force L, the yaw force Y and the thrust vector T are all equal on each side, with no yaw reaction resulting.

Figure 4:
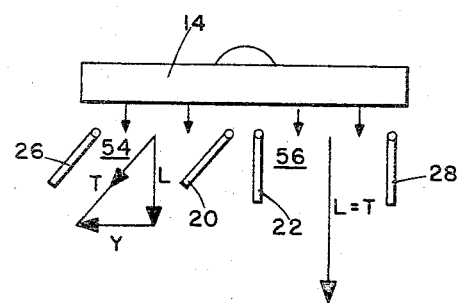
FIGURE 4 is a diagram of the lift and yaw forces in substantially maximum yaw position.

To apply a yawing action to the aircraft the control doors are all moved in a common direction, the maximum yaw position being indicated in broken line in FIGURE 2. In this position the control doors 20, 26 have swung outwardly to deflect the flow through channel 54 in a more lateral direction. Simultaneously the doors 22, 28 have swung downwardly to deflect the flow through channel 56 in a substantially vertical direction. From the corresponding force diagram of FIGURE 4, it can be seen that the yaw force Y in channel 54 has increased and the lift force L has decreased, the thrust vector T remaining constant. However, in the channel 56 the yaw force has disappeared and the lift force L has increased to equal the full value of the thrust vector T. The increase of lift in channel 56 compensates for the decrease in lift in channel 54, so that the total lift remains constant while a lateral yaw force is applied. In actual practice the compensation may not be perfect due to flow losses caused by directional differences, but the change in total lift will be so small as to be negligible, compared to the large changes incurred with flow spoiling or more directional deflection of flow without compensation.

*Alternative installations*

Figure 6:
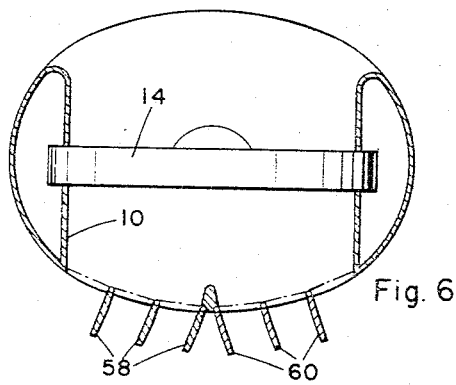
FIGURES 6–9 are sectional views similar to FIGURE 2, on a reduced scale, showing various ducted fan, lift engine and door arrangements.

The system is adaptable to a variety of power sources and door arrangements. The arrangement illustrated in FIGURE 6, for example, is basically similar to that described above, but flow is controlled by a plurality of small control doors 58 and 60 arranged in groups on opposite sides. Carried to an extreme, the control doors might become an array of louvers or vanes, but would be interconnected by a mechanism comparable to that of FIGURE 5 to maintain the balanced lift function.

Figure 7:
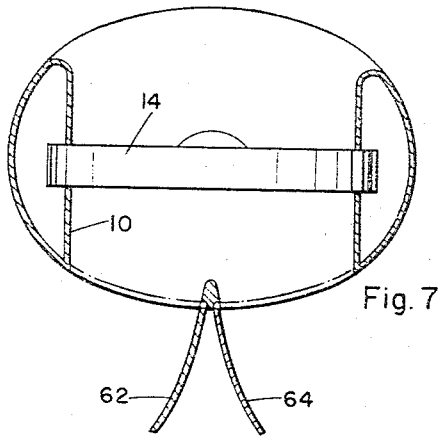

A further arrangement utilizing a ducted fan unit 14 is shown in FIGURE 7, in which two large doors 62 and 64 are hinged at the longitudinal axis. The flow is still divided into two streams deflected at equal inclinations outwardly at neutral, with one stream turned further to the side and the other directed down for yaw control with constant lift.

Figure 8:
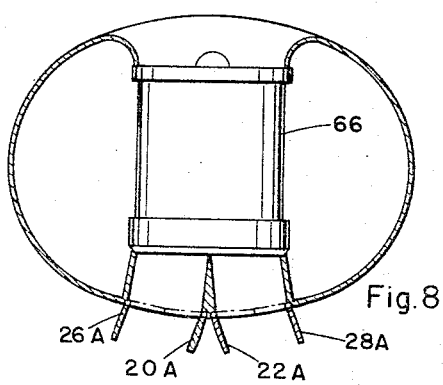

A turbojet type lift engine, such as indicated at 66 in FIGURE 8, can also be provided with the constant lift yaw control means, the arrangement shown using paired doors 20A, 26A and 22A, 28A, similar to those in FIGURE 2.

Figure 9:
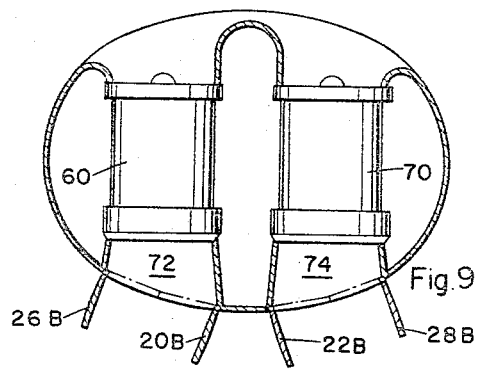

A further installation is shown in FIGURE 9, using a pair of lift engines 68 and 70 mounted side by side and exhausting into individual outlets 72 and 74, respectively. The two outlets are equivalent to the divided outlet of other configurations and are provided with paired control doors 20B, 26B and 22B, 28B. Other configurations will be readily apparent for various gas or air flow sources.

It is understood that minor variation from the form of the invention disclosed herein may be made without departure from the spirit and scope of the invention, and that the specification and drawings are to be considered as merely illustrative rather than limiting.

We claim:
1. In an aircraft, a yaw control system, comprising:
  a source of gas flow having a substantially downwardly directed outlet;
  flow guiding means mounted at said outlet and having guiding elements dividing the flow into separate streams;
  said guiding elements having a neutral position at which the streams of gas flow are directed symmetrically divergently downwardly;
  and said guiding elements being movable to deflect one stream of the gas flow more laterally while simutaneously deflecting the other stream more nearly vertically downwardly, whereby the total effective lift force of the gas flow is substantially constant.

2. In an aircraft, a yaw control system, comprising:
  a source of gas flow having a substantially downwardly directed outlet;
  flow guiding means at said outlet, including control doors pivotally mounted on the aircraft and disposed to divide the gas flow into separate streams;
  said control doors having a neutral open position inclined outwardly on opposite sides of said outlet to direct the streams of gas flow symmetrically and divergently downwardly;
  and said control doors being movable to deflect one stream of gas flow more laterally while simultaneously deflecting the other stream more vertically downwardly, whereby the total effective lift force of the gas flow is substantially constant.

3. A yaw control system according to claim 2 and including actuating means coupled to said control doors to open and close the doors collectively, said doors sealing said outlet in closed position and forming portions of the aircraft surface structure.

4. A yaw control system according to claim 2 and including yaw control means coupled to said control doors to move all of the doors in a common direction.

5. In an aircraft, a yaw control system, comprising:
  a duct in said aircraft having a downwardly directed outlet;
  means mounted in said duct to generate gas flow downwardly therefrom;
  flow guiding control doors mounted in said outlet and being pivotal on axes substantially longitudinal of the aircraft;
  said control doors being arranged on opposite sides of said outlet and defining channels dividing the gas flow into separate streams;
  means to open said control doors to a neutral position at which the doors are inclined outwardly and downwardly and the streams of gas flow are deflected symmetrically divergently to opposite sides of the aircraft;
  and means to move said control doors collectively in a common direction.

6. A yaw control system according to claim 5, wherein said last mentioned means comprises yaw control means connected to said control doors and being operable to swing the control doors on one side of said outlet outwardly while swinging the control doors on the other side of the outlet proportionally downwardly, whereby the total effective lift force of the gas flow is substantially constant.

References Cited

UNITED STATES PATENTS 3,094,298  6/1963  Hess et al. _____ 244—23

FOREIGN PATENTS 1,318,559  1/1963  France.
1,357,138  2/1964  France.

MILTON BUCHLER, *Primary Examiner.*

A. E. CORRIGAN, *Assistant Examiner.*